(No Model.)
C. LEIGH.
FRUIT SQUEEZER.
No. 592,652. Patented Oct. 26, 1897.
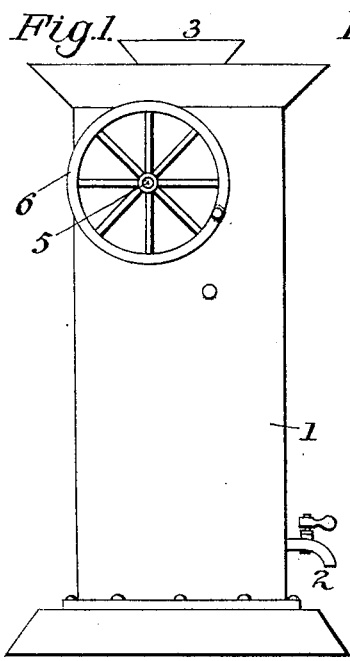
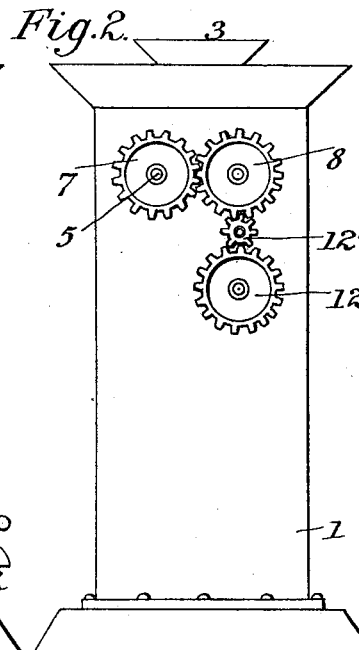
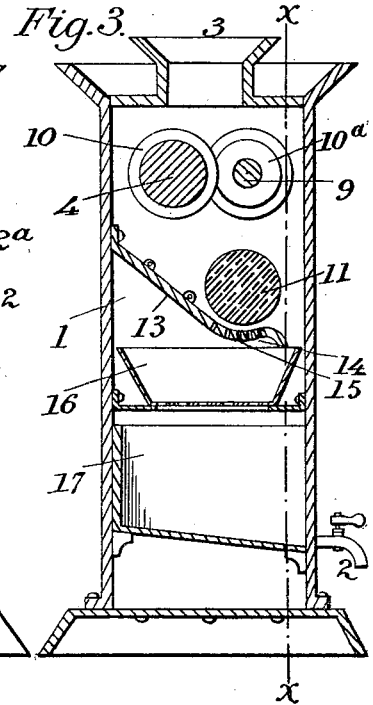
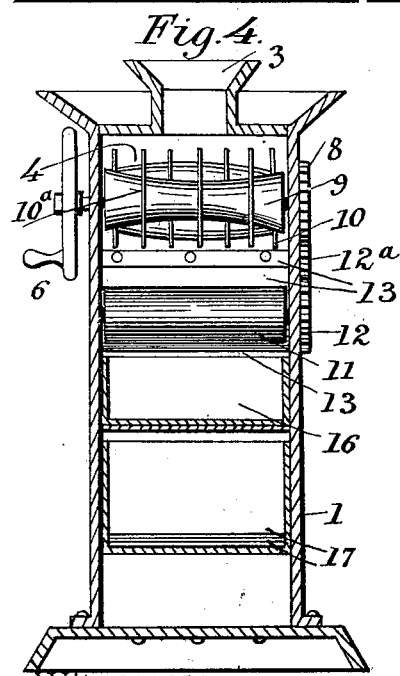
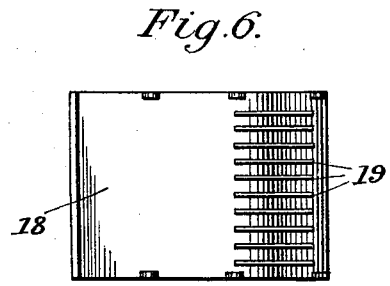
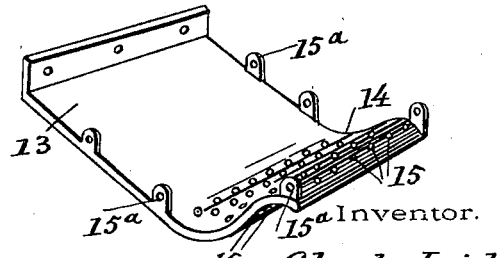
Witnesses:
Inventor.
Charles Leigh,
by Attorney.
THE NORRIS PETERS CO., PHOTO-LITHO., WASHINGTON, D. C.

UNITED STATES PATENT OFFICE.

CHARLES LEIGH, OF KNOTTSVILLE, KENTUCKY.

FRUIT-SQUEEZER.

SPECIFICATION forming part of Letters Patent No. 592,652, dated October 26, 1897.

Application filed August 5, 1897. Serial No. 647,189. (No model.)

*To all whom it may concern:*

Be it known that I, CHARLES LEIGH, a citizen of the United States, residing at Knottsville, in the county of Daviess and State of Kentucky, have invented certain new and useful Improvements in Lemon-Squeezers, of which the following is a specification.

This invention relates to fruit-squeezers, and particularly to a lemon cutter and squeezer.

The object of the invention is to provide a machine of improved novel and peculiar construction and arrangement of parts to cut and squeeze lemons and other similar fruit by one and the same operation and further mash and squeeze the fruit after being cut.

A further object of the invention is to provide an apron or mesh-board having a perforated end, against and through which the fruit is squeezed.

In the accompanying drawings, forming part of this application, Figure 1 is an elevation of my machine. Fig. 2 is a similar view of the opposite side of the machine. Fig. 3 is a vertical section. Fig. 4 is a section on the line $x\ x$, Fig. 3. Fig. 5 is a perspective view of the perforated apron or board. Fig. 6 is a top plan view of a modified form of apron.

The same numeral-references denote the same parts throughout the several figures of the drawings.

The casing 1 is of rectangular form, having a discharge-cock 2 and a hopper 3, through which the fruit is passed into the machine. The roller 4 is journaled in the sides of the casing, and its spindle or shaft 5 is provided with a hand-wheel 6 and a gear 7, which meshes with the gear 8 on the roller 9, journaled in the sides of the casing 1. One of the said rollers is concaved and the other convexed. The rollers 4 and 9 have disk cutters 10 and $10^a$, respectively, secured intermediate each other.

An auxiliary or supplemental roller 11, composed of rubber or other suitable cushion material, is journaled lower down in the sides of the casing 1 and has a gear 12 in mesh with a pinion $12^a$, which meshes with the gear 8.

Secured or fixed upon the inside of the casing and extending on an incline below the said three rollers 4, 9, and 11 is a mesh board or apron 13, having a concaved end 14, provided with perforations 15 and ears $15^a$ for securing it in place. Directly below this apron is placed a seed and refuse receptacle or pan 16, having a perforated bottom, and below the pan 16 is placed a juice-tray 17, in communication with the cock 2. The modified form of apron or board 18 has a series of slots 19 in its lower portion.

The operation of the machine is as follows: The lemons, being thrown into the hopper 3, fall directly on the rollers 4 and 9, respectively, and are cut by the cutters 10 and $10^a$ and partially squeezed by the said rollers, from whence the parts of the lemon drop into the apron 13 and are carried down between the roller 11 and the perforated end 14, where said parts are finally squeezed. The seed and peeling fall over the edge of the said end 14 into the receptacle 16 and the juice passes through the perforations 15 and through the perforated bottom of the pan 16 into the juice-tray.

It will be observed that the fruit is pressed and cut at one and the same time by the cutter-rollers and that it is further pressed by the cushion-roller, so that no juice whatever is left in the fruit. It will also be observed that the juice receives double straining, first by the apron and then by the perforated pan-bottom, so that no seed or particles of the fruit is left in the juice when ready for use.

Having thus described my invention, what I claim as new, and desire to secure by Letters Patent, is—

The combination in a machine for cutting and squeezing lemons or similar fruit, the concave and convex presser-rollers having cutter-disks, the disks of one roller adapted to revolve intermediate the disks of the other roller, a cushion-roller beneath the said two rollers, a mesh-board having a concaved perforated end extending underneath the cushion-roller, a seed-pan having a perforated bottom, and a juice-pan adapted to receive the liquid strained through the said perforated end and said perforated pan-bottom, substantially as and for the purpose set forth.

In witness whereof I hereunto set my hand in the presence of two witnesses.

CHARLES LEIGH.

Witnesses:
H. GUS CLEMENTS,
BILL HIGDON.